Feb. 27, 1962   R. E. SCOTT   3,023,405
ANALOG CONVERTER
Filed May 17, 1960

INVENTOR.
RONALD E. SCOTT
BY Roberts, Cushman & Grover
ATT'YS.

United States Patent Office 3,023,405
Patented Feb. 27, 1962

3,023,405
ANALOG CONVERTER
Ronald E. Scott, % Contronics Inc., 37 Leon St., Boston, Mass.
Filed May 17, 1960, Ser. No. 29,761
10 Claims. (Cl. 340—347)

This invention involves a device for measuring the amplitude of an electrical signal by selecting one of a plurality of conductors to carry a significant output current. More particularly the invention relates to a converter device for changing analog information to digital information.

Various complex electronic circuits and devices are available for converting analog signals to digital signals. Such converters are usually slow in operation and low in accuracy.

Thus the object of the present invention is to provide a novel converter which is extremely rapid in action, simple in structure and high in accuracy.

According to the invention a converter device for measuring the amplitude of an electrical signal comprises an insulative support, an electrically conductive layer on said support, at least three terminals connected to said layer at spaced locations one pair of said terminals being adapted to carry a reference voltage and a different pair of terminals being adapted to carry an electrical signal voltage so as to produce an electrical field in the area of said layer between said terminals, and a plurality of output conductors connected to said layer at points along a curve in said area, said curve being defined by the maxima of equipotential lines of said electrical field.

For the purpose of illustration a typical embodiment of the invention is shown in the accompanying drawing in which.

Figures 3, 4:
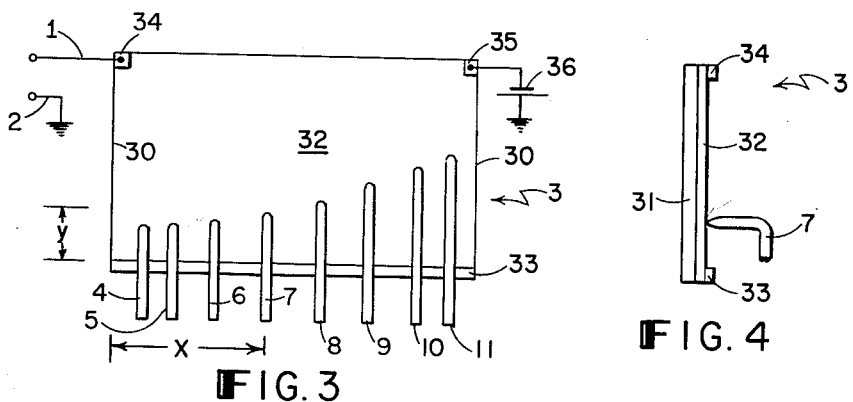
FIG. 3 is a plan view of an analog signal measuring device used in the system.
FIG. 4 is a side view of the device.

The converter current measuring device itself, shown in FIGS. 3 and 4, comprises a rectangular insulating support 31 4 by 6 inches, for example, on which is coated a layer of electrically conductive material 32 such as conducting graphite. The layer may be a few thousandths of an inch thick and may have a resistance of 100 ohms per inch. Along one edge of the layer is a very low resistance strip 33 of silver, for example, which acts as a bus bar to hold the entire length of the edge substantially at the ground potential.

Figure 1:
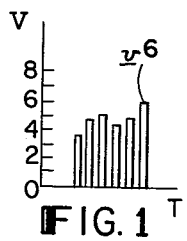
FIG. 1 is a voltage-time graph of a pulsed analog signal.
Figure 2:
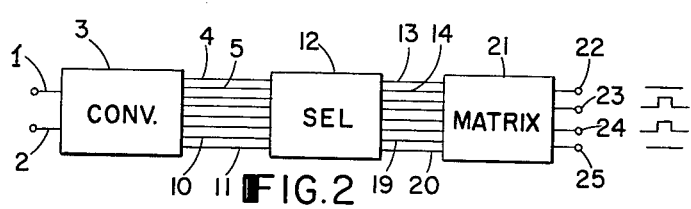
FIG. 2 is a block diagram of a converter system.

On the two corners at the opposite edge of the layer are two small terminals 34 and 35. As indicated schematically in FIG. 3 the bus bar 33 is grounded and a reference voltage source 36 is connected to the input terminal 34. The signal to be measured is applied through two input leads 1 and 2 connected respectively to the other input terminal 34 and to ground. The input signal may be a steady voltage, a continuously varying voltage, or as shown in FIG. 1 a varying voltage which has been chopped into successive pulses such as $v6$.

The reference voltage and signal voltage produce an electrical field in the area of the layer 32 defined by terminals 33, 34 and 35 such that at any instant there will exist between the two input terminals and the bus bar 33 a family of equipotential lines generally convex upwardly. Any one of these equipotential lines will change as the signal at terminal 34 varies, and the highest point of this line will, so to speak, roll from one vertical edge 30 of layer 32 to the other as the input signal rises above and falls below the reference voltage.

At points intersected only by a selected one of such rolling equipotential lines there are connected to the layer 32, for example, output leads 4 to 11. These leads may be wires soldered or welded to the layer, or as shown in FIG. 4, they may be spring urged, pointed contacts. The contacts are located on a curve which is concave upward and running generally alongside the bus bar 33.

The points may be located as in the following example:
Assume that 36 points are to be connected, that the terminal 35 is held at a fixed voltage of —6 volts, and that the signal at terminal 34 varies between 0 and —36 volts. The voltage at terminal 34 is held at —1 volt and a voltmeter is connected to the ground bus 33 and by the voltmeter probe to the conducting layer 32. The probe of the voltmeter is moved across the layer until a point at minus 0.5 volt, for example, is located. The probe is then moved along the —5 volt equipotential line until the maximum point on the line furthest from the bus 33 is located and marked or the connection 4 to it made. The voltage at terminal 34 is then changed to —2 volts and another maximum point located. This location is repeated as the voltage at terminal 34 is increased stepwise to —36 volts, and the remainder of the 36 points are located.

When a varying voltage such as shown in FIG. 1 is applied to the input terminal 34 the voltage at one of the output leads 4 to 11 will be lower than that at any other contact. The leads are so spaced that the distance $x$ from one edge to the lowest voltage lead is dependent on or proportional to the instantaneous input signal voltage.

As shown diagrammatically the output leads 4 to 11 of the converter 3 are connected to an electrical circuit 12 which selects the instantaneous lowest voltage lead and applies a signal to one of a corresponding number of leads 13 to 20 connecting the selector circuit 12 with a digital encoding matrix 21. Depending on which connecting lead 13 to 20 is conducting, one or more binary output leads 22 to 25 will carry a signal. In the example shown, where the instantaneous voltage $v6$ is 6 volts, the second and third binary output leads, 23 and 24, will carry a pulse, while the other two leads will not.

Figure 5:
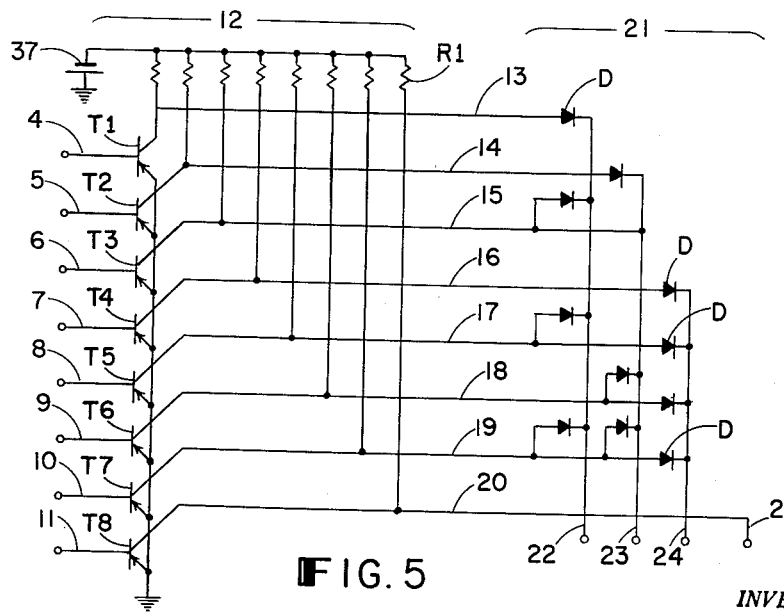
FIG. 5 is a schematic diagram of the selecting and matrix used in the system.

The selector circuit 12 and matrix 21 are shown schematically in FIG. 5. The converter output leads 4 to 11 are respectively connected to the base of transistors T1 to T8. A suitable transistor is Fairchild type 2N696. Respective emitters are connected directly to ground. Respective collectors of the transistors are connected through 1000 ohm resistors R1 to a positive voltage supply 37 of 10 to 30 volts. The collectors are also connected by leads 13 to 20 to the encoding matrix 21.

If, for example, converter lead 9, which corresponds to —6 volts signal input, is carrying the lowest voltage, only transistor T6 will conduct since the other transistors are reverse biased. Conduction of T6 for the duration of the input pulse $v6$ causes the connecting lead 18 to carry a momentary pulse of current. This pulse will be coupled through two diodes D (type IN 643A) to matrix output leads 23 and 24. As previously explained, the appearance of a pulse on these two lines represents the binary coding 0110 corresponding to the analog value 6.

It will be understood that selector circuits other than selector 12 are known and may be used with the novel converter 3. The selector circuit output may be used or displayed in other ways than that illustrated by the matrix 21.

It will further be understood that various resistive materials are useful for making the converter 3. A semiconductor material may be substituted for the resistive layer. The size of the converter and the number of output leads may be varied to suit the needs of accuracy of measurement. For example if a voltage is to be measured to within 1% accuracy, 128 output leads would be connected to the resistive layer 32. The layer may be lengthened, say to 20 inches, to provide room for the increased number of leads. These and other modifications and equivalents within the scope of the appended claims will be apparent to one skilled in this art.

I claim:

1. An electrical device for measuring the amplitude of an electrical signal which comprises an insulative support, an electrically conductive layer on said support, at least three terminals connected to said layer at spaced locations, one pair of said terminals being adapted to carry a reference voltage and a different pair of said terminals being adapted to carry an electrical signal voltage so as to produce an electrical field in the area of said layer between said terminals whose equipotential lines vary with said signal, and a plurality of output conductors connected to said layer at points along a curve in said area, said curve being defined by the maxima of equipotential lines of said electrical field.

2. An electrical device for measuring the amplitude of an electrical signal which comprises an insulative support, an electrically conductive layer on said support, at least three terminals connected to said layer at spaced locations, one pair of said terminals being adapted to be connected to a reference voltage and a different pair of said terminals being adapted to be connected to an electrical signal voltage so as to produce an electrical field in the area of said layer between said terminals whose equipotential lines vary with said signal, and a plurality of output conductors connected to said layer at points along a curve in said area, said curve being defined by the maxima of equipotential lines of the same potential in varying fields.

3. An electrical device for measuring the amplitude of an electrical signal which comprises an insulative support, an electrically conductive layer on said support, at least three terminals connected to said layer at spaced locations, one pair of said terminals being adapted to be connected to a reference voltage and a different pair of said terminals being adapted to be connected to an electrical signal voltage so as to produce an electrical field in the area of said layer between said terminals whose equipotential lines vary with said signal, said conductive layer having a uniform resistance characteristic in the area defined by said terminals, and a plurality of output conductors connected to said layer at points along a curve in said area, said curve being defined by the maxima of equipotential lines of said electrical field.

4. An electrical device for continuously measuring the amplitude of a varying electrical signal which comprises an insulative support, an electrically conductive layer on said support, at least three terminals connected to said layer at spaced locations, means to apply a constant, reference voltage to one pair of said terminals, means to apply a varying signal voltage to a different pair of said terminals so as to produce an electrical field in the area of said layer between said terminals whose equipotential lines vary with said signal, and a plurality of output conductors connected to said layer at points along a curve in said area, said curve being defined by the maxima of equipotential lines of said electrical field, whereby for any amplitude of reference signal a predetermined one of said conductors carries a higher voltage than any other.

5. An electrical device for measuring the amplitude of an electrical signal which comprises an insulative support, an electrically conductive layer on said support, at least three terminals connected to said layer at spaced locations, one pair of said terminals being adapted to carry a reference voltage and a different pair of said terminals being adapted to carry an electrical signal voltage so as to produce an electrical field in the area of said layer between said terminals whose equipotential lines vary with said signal, a plurality of output conductors connected to said layer at points along a curve in said area, said curve being defined by the maxima of equipotential lines of said electrical field, and utilization means coupled to respective conductors.

6. An electrical device for measuring the amplitude of an electrical signal which comprises an insulative support, an electrically conductive layer on said support, at least three terminals connected to said layer at spaced locations, one pair of said terminals being adapted to carry a reference voltage and a different pair of said terminals being adapted to carry an electrical signal voltage so as to produce an electrical field in the area of said layer between said terminals whose equipotential lines vary with said signal, a plurality of output conductors connected to said layer at points along a curve in said area, said curve being defined by the maxima of equipotential lines of said electrical field, and a circuit coupled to said conductors for selecting one of said conductors according to the voltage at the point of said layer to which said conductor is connected.

7. An electrical device for measuring the amplitude of an electrical signal which comprises an insulative support, an electrically conductive layer on said support, at least three terminals connected to said layer at spaced locations, one pair of said terminals being adapted to carry a reference voltage and a different pair of said terminals being adapted to carry an electrical signal voltage so as to produce an electrical field in the area of said layer between said terminals whose equipotential lines vary with said signal, a plurality of output conductors connected to said layer at points along a curve in said area, said curve being defined by the maxima of equipotential lines of said electrical field, a circuit including a plurality of electronic valves having inputs respectively connected to said conductors, means biasing said valves so as to allow conduction only of the valve whose input is connected to the conductor at the point of highest voltage on said curve, each said valve having an output carrying a signal when the valve conducts.

8. An electrical device for measuring the amplitude of an electrical signal which comprises an insulative support, an electrically conductive layer on said support, at least three terminals connected to said layer at spaced locations, one pair of said terminals being adapted to carry a reference voltage and a different pair of said terminals being adapted to carry an electrical signal voltage so as to produce an electrical field in the area of said layer between said terminals whose equipotential lines vary with said signal, a plurality of output conductors connected to said layer at points along a curve in said area, said curve being defined by the maxima of equipotential lines of said electrical field, and a circuit coupled to said conductors for selecting one of said conductors according to the voltage at the point of said layer to which said conductor is connected, and a matrix for converting the signal of respective conductors to digital form.

9. An electrical device for measuring the amplitude of an electrical signal which comprises an insulative support, an electrically conductive layer on said support, at least three terminals connected to said layer at spaced locations, one pair of said terminals being adapted to carry a reference voltage and a different pair of said terminals being adapted to carry an electrical signal voltage so as to produce an electrical field in the area of said layer between said terminals whose equipotential lines vary with said signal, a plurality of output conductors connected to said layer at points along a curve in said area, said curve being defined by the maxima of equipotential lines of said electrical field, and a circuit coupled to said conductors for selecting one of said conductors according to the voltage at the point of said layer to which said conductor is connected, and a matrix for converting the signal on respective outputs to digital form.

10. An electrical device for measuring a characteristic of an electrical signal which comprises an electrically conductive layer, means to support said layer, at least three terminals connected to said layer at spaced locations, one pair of said terminals being adapted to carry a first electrical signal and a second pair of said terminals being adapted to carry a different electrical signal so as to produce in the area of said layer between said terminals an electrical field whose equipotential lines and maximum field line vary with said signals, and means distributed along a curve in said area selectively responsive to the instantaneous maximum field, said curve being defined by the maxima of equipotential lines of the same potential in varying fields.

No references cited.